United States Patent [19]

Paradis et al.

[11] 4,369,812
[45] Jan. 25, 1983

[54] CONTROL OF FLUID FLOW USING PRECISELY POSITIONED DISC

[75] Inventors: Joseph R. Paradis, Holden; Edward W. Kaleskas, Jefferson, both of Mass.

[73] Assignee: Nypro Inc., Clinton, Mass.

[21] Appl. No.: 235,668

[22] Filed: Feb. 18, 1981

[51] Int. Cl.³ ............................................. F16K 15/14
[52] U.S. Cl. .................................................. 137/843
[58] Field of Search ................... 137/512.15, 843, 854, 137/860, 533.17, 533.19, 519; 251/367

[56] References Cited

U.S. PATENT DOCUMENTS

| | | | |
|---|---|---|---|
| 2,223,944 | 12/1940 | Roy | 137/543.19 |
| 3,807,445 | 4/1974 | McPhee | 137/843 X |
| 3,889,710 | 6/1975 | Brost | 137/843 X |
| 3,954,121 | 5/1976 | Kardos | 137/854 |
| 4,037,784 | 7/1977 | Sabarly | 137/859 X |
| 4,141,379 | 2/1979 | Manske | 137/859 X |
| 4,142,677 | 3/1979 | Ludwig | 251/367 X |
| 4,222,407 | 9/1980 | Ruschke et al. | 137/843 |

Primary Examiner—Robert G. Nilson
Attorney, Agent, or Firm—George E. Kersey

[57] ABSTRACT

Method and apparatus for the control of fluid flow using a flexible disc that is positioned in a control channel and restricted to movement along the longitudinal axis of the channel. Closure control is exercised by moving the disc into closer contact with a ring seat that is essentially self-purging of debris. Since the disc is confined to essentially longitudinal movement, distortion due to random lateral movement is avoided.

12 Claims, 8 Drawing Figures

CONTROL OF FLUID FLOW USING PRECISELY POSITIONED DISC

BACKGROUND OF THE INVENTION

This invention relates to flow control, and, more particularly, to the control of fluid flow making use of pressure differentials. This application is a continuation-in-part of Ser. No. 050,823, filed June 21, 1979, now U.S. Pat. No. 4,286,628, issued Sept. 1, 1981.

In many situations it is necessary to control the flow of fluids, such as liquids and gases. A common device for that purpose is known as a check valve. It functions by the deflection of an elastomeric element towards a valve seat in order to prevent flow and away from the seat to permit flow.

One such device is the check valve disclosed in U.S. Pat. No. 3,889,710 which issued to Julien H. Brost on June 17, 1975. It contains an elastomeric disc that is deflected towards and away from a concave seating surface that surrounds an inlet. The disc is deliberately made smaller than the seating surface. This is to permit reverse flow around the edges of the disc.

Unfortunately, the use of a concave seating surface with a floatable disc, i.e. one that is smaller than the seating surface, causes a number of difficulties. In the first place a valve with a concave seating surface is susceptible to malfunction because inevitable particles of debris that become trapped between the disc and its concave seat. Once debris becomes trapped it tends to remain on the seat during subsequent operations of the valve. In addition since the disc is smaller than its seat it tends to move about with the result that different portions of the surface become stressed during subsequent operations. Furthermore, there is an undesirable tendency for a portion of the disc to be drawn into the associated inlet during closure operation of the valve.

Other known valves for controlling flow are those illustrated by the following patents:

| U.S. Pat. No. | Issued | Inventor |
| --- | --- | --- |
| 797,739 | 8/1905 | Meer |
| 1,412,473 | 4/1922 | Lane |
| 1,506,012 | 8/1924 | Lewis |
| 2,547,377 | 4/1951 | Juhasz |
| 3,342,866 | 4/1966 | Sanz |
| 3,664,371 | 5/1972 | Schneider |

Still other known valves for controlling flow are those illustrated by the following additional patents:

| U.S. Pat. No. | Issued | Inventor |
| --- | --- | --- |
| 3,807,445 | 4/1974 | McPhee |
| 3,954,121 | 5/1976 | Kardos |

Accordingly, it is an object of the invention to facilitate the control of fluid flow. A related object is to facilitate the control of fluid flow using differential pressures.

A further object of the invention is to overcome the difficulties associated with prior check valves. A related object is to avoid the difficulties associated with a single disc check valves.

Still another object of the invention is to avoid the difficulties associated with "floatable" disc. A related object is to avoid the difficulties associated with discs that are smaller than their associated seats. Another related object is to avoid the random wear pattern associated with "floatable" discs.

Yet another object of the invention is to reduce disc distortion in check valves. A related object is to reduce the tendency for a disc to be drawn into a flow channel and produce disc distortion.

A yet further object of the invention is to facilitate the seating action of a valve disc and render the valve substantially self purging of debris, such as dirt and dust, that could otherwise interfere with the seating operation.

SUMMARY OF THE INVENTION

In accomplishing the foregoing and related objects, the invention provides for the exercise of the flow control using a resiliant and flexible disc which is restricted to movement along the longitudinal axis of a control channel. This avoids the disadvantages of variable positionable discs, while retaining their advantages.

In accordance with one aspect of the invention the disc is symmetrically positioned with respect to the control channel to assure uniform performance of the disc during opening and closure operations.

In accordance with another aspect of the invention, the disc has a ring seat with rounded, convex shoulders that facilitate seating during initial preloading of the disc, and facilitate the self-purging of debris from the seat.

In accordance with still another aspect of the invention, the entrance of the flow channel is a base depression surrounded by the ring seat. This helps assure that the disc is securely seated when the valve is fully closed.

In accordance with yet another aspect of the invention, the base depression of the ring seat includes radial channels that limit the tendency for the disc to be drawn into the flow channel.

According to a further aspect of the invention, the control channel includes peripheral grooves for the flow of fluid during the open condition of the valve.

According to a still further aspect of the invention, the disc is prestressed by a member with auxiliary flow channels for accommodating the reverse flow of fluid through the valve. The latter channels are desirably symmetrically, laterally and radially positioned with respect to a main flow channel.

BRIEF DESCRIPTION OF THE DRAWINGS

Other aspects of the invention will become apparent after considering several illustrative embodiments taken in conjunction with the drawings in which.

DETAILED DESCRIPTION

Figure 1:
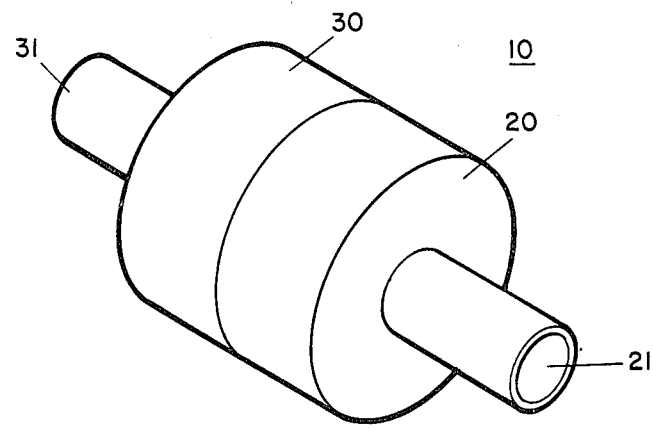
FIG. 1 is a perspective view of a control valve in accordance with the invention.

With reference to the drawings, an illustrative control valve 10 in accordance with the invention is shown in FIG. 1.

Figure 2:
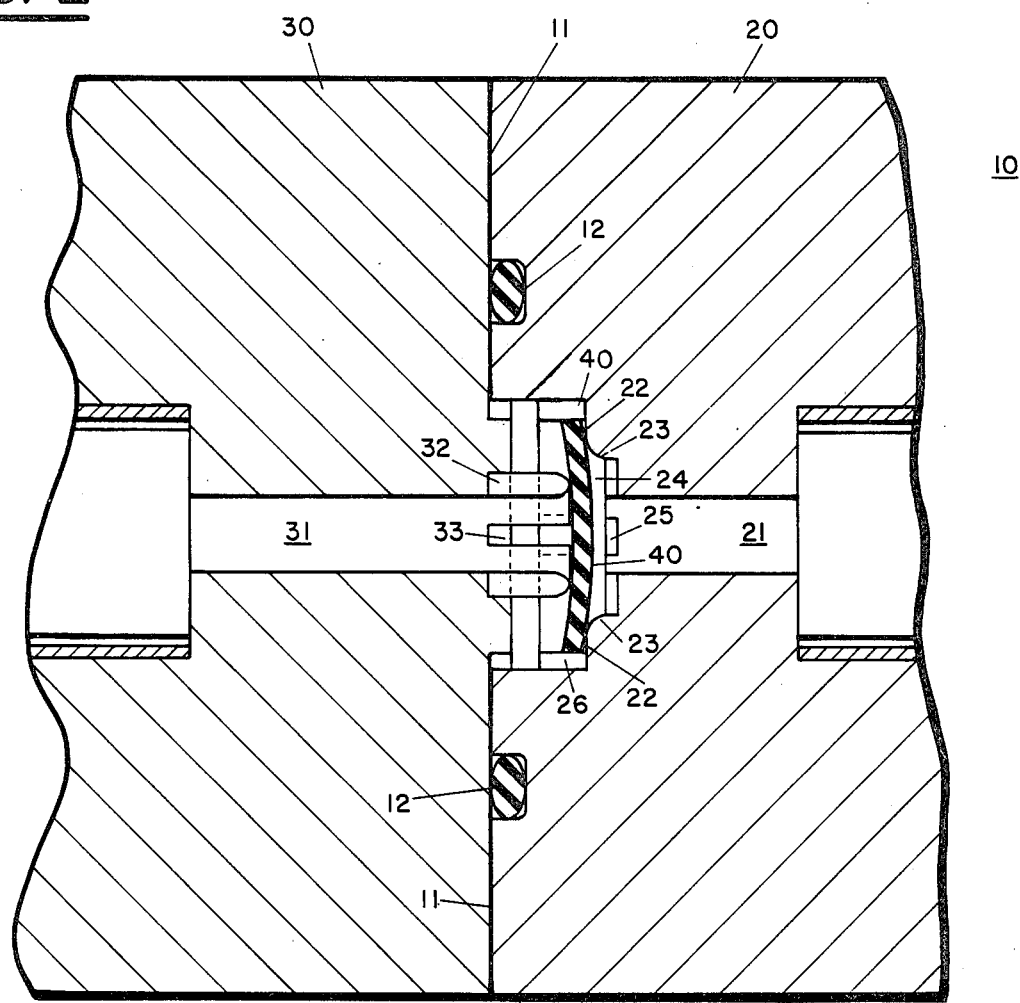
FIG. 2 is a fragmentary cross-sectional view of the control valve of FIG. 1.

The control valve 10 is formed by complementary body members 20 and 30 with flow channels 21 and 31 that are controlled by a flexible, elastomeric control disc 40, as shown in the cross-sectional view of FIG. 2.

The control disc 40 is positioned within a control channel 21 of a body member 20. By contrast with the prior art, the disc 40 has substantially the same circumferential diameter as the channel 21. As a result there is substantially no lateral movement of the disc 40 with respect to the channel 21.

As further indicated in FIG. 2, the disc 40 is seated on the flange surface of a ring seat 22. The ring 22 has a hollow interior with a convex shoulder 23 to promote secure sealing in accordance with the invention.

Figure 3:
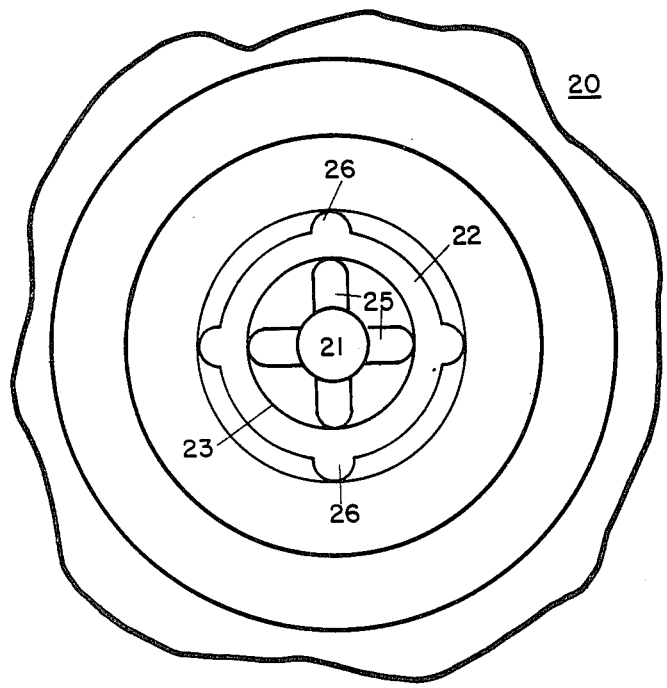
FIG. 3 is an end view of a constituent member of the control valve showing structural channels for reverse operation and the avoidance of control disc distortion.

In addition, the ring seat 22 surrounds a base depression 24 containing the inlet of the channel 21. The base depression 24 further includes a set of radial channels 25 (more particularly shown in FIG. 3) that insure that the disc 40 will not be pulled into the inlet of the channel 21, and thus produce undesired distortion and distension of the disc 40. Longitudinal channels 26 are included at the periphery of the control channel 21 to facilitate reverse flow through the valve 10.

Figure 4:
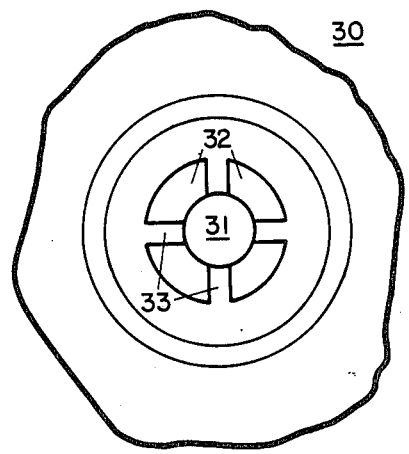
FIG. 4 is an end view of a complementary constituent member of the valve showing an abutment structure for preloading the control disc and facilitating reverse operation.

The disc 40 is prebiased to provide initial seating contact against the ring 22 by prongs 32 of the member 30. These prongs 32, which are illustrated in end view in FIG. 4, are separated by passageways 33 which extend to the outlet channel 31.

It is to be noted that the joinder of the complementary portions 20 and 30 of the body structure 10 can be made in any convenient way along an interface 11. For the particular embodiment of FIG. 2, the interface 11 includes a sealing ring 13, but it will be understood that such a ring is illustrative only and that a wide variety of sealing techniques may be used.

Figure 5:
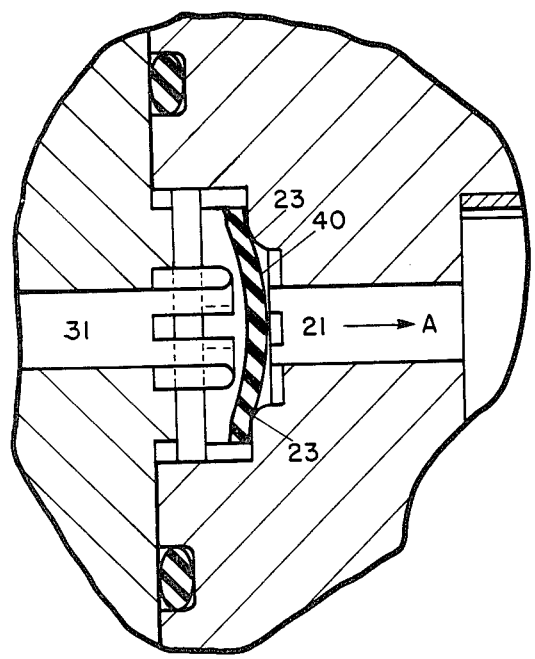
FIG. 5 is a fragmentary view of the structure of FIG. 2 showing the control disc in its closed position to prevent fluid from flowing through the valve.

As shown in FIG. 5, when a differential pressure exits between the channels 21 and 31, with the greater pressure at the channel 31, for example produced by a vacuum applied to the channel 21 in the direction of the arrow A, the disc 40 is drawn away from the prongs 32 into closer contact with the shoulder 23 of the ring seat 22, bringing about the desired closure of the valve 10 and isolation of the channels 21 and 31. Since the sealing surface of the ring 22 is in the form of a convex shoulder 23 that extends circumferentially about the base depression 24, the desired seal is achieved without any adverse effect because of the inadvertent pressure of dirt or debris on the sealing edge 23. This is by contrast with, for example, the sealing surfaces of prior art devices in which the presence of dirt and debris will interfere with the desired closure. In such a case the initial application of sealing pressure does not dislodge the debris, but instead traps it between the disc and the sealing surface. In the case of the present invention, however, any debris on the ring seat tends to be moved away by the appreciable convex curvature 23 of the ring 22, coupled with the interior void formed by the base depression 24.

It is to be noted that because of the radial channels 25 in the base depression 24, the disc 40 cannot be drawn into the inlet channel 21. This avoids the distension of the control disc frequently found in other devices, caused by having the disc sucked into a flow channel.

Figure 6:
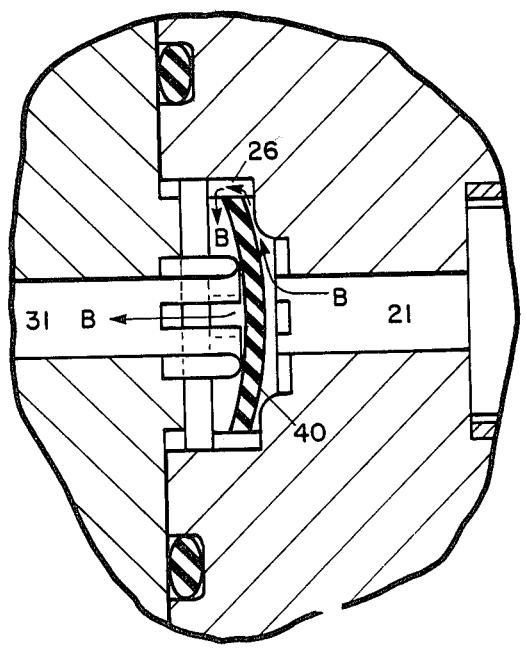
FIG. 6 is a fragmentary view similar to that of FIG. 5 showing the control disc in its open position to permit the passage of fluid through the valve.

The reverse operation of the valve 10 is illustrated in FIG. 6. When the differential pressure that pulls the disc 40 against the shoulder 23 is removed and the flow is reversed, the disc 40 again is positioned against the prongs 32. Flow can now take place in the direction indicated by the arrow B between the ring seat 22 and the edge of the disc 40 through the auxiliary longitudinal channels 26. Because of the channels 26, it is not necessary to reduce the diameter of the disc 40 below that of the control channel 21 in order to permit the desired reverse operation.

Figure 7:
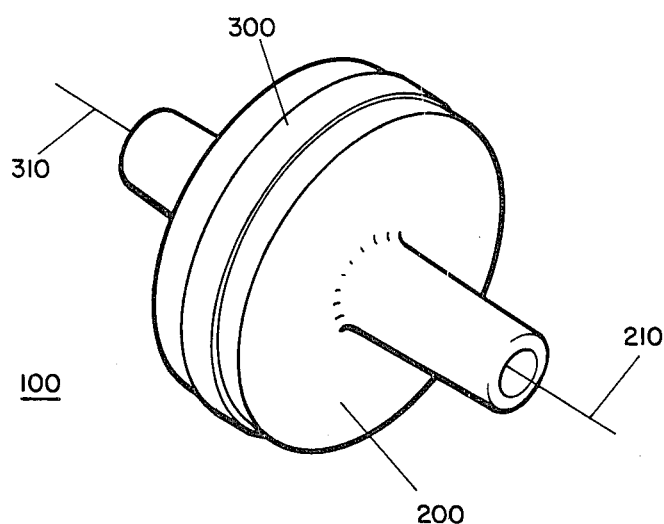
FIG. 7 is a perspective view of an alternative control valve in accordance with the invention.

An alternative control valve 100 in accordance with the invention is illustrated in FIG. 7. As in the case of the control valve 10 of FIG. 1, the valve 100 of FIG. 7 is formed by complementary body members 200 and 300 with flow channels 210 and 310 that are controlled by a flexible, elastomeric control disk 400, illustrated in the cross-sectional view of FIG. 8.

Figure 8:
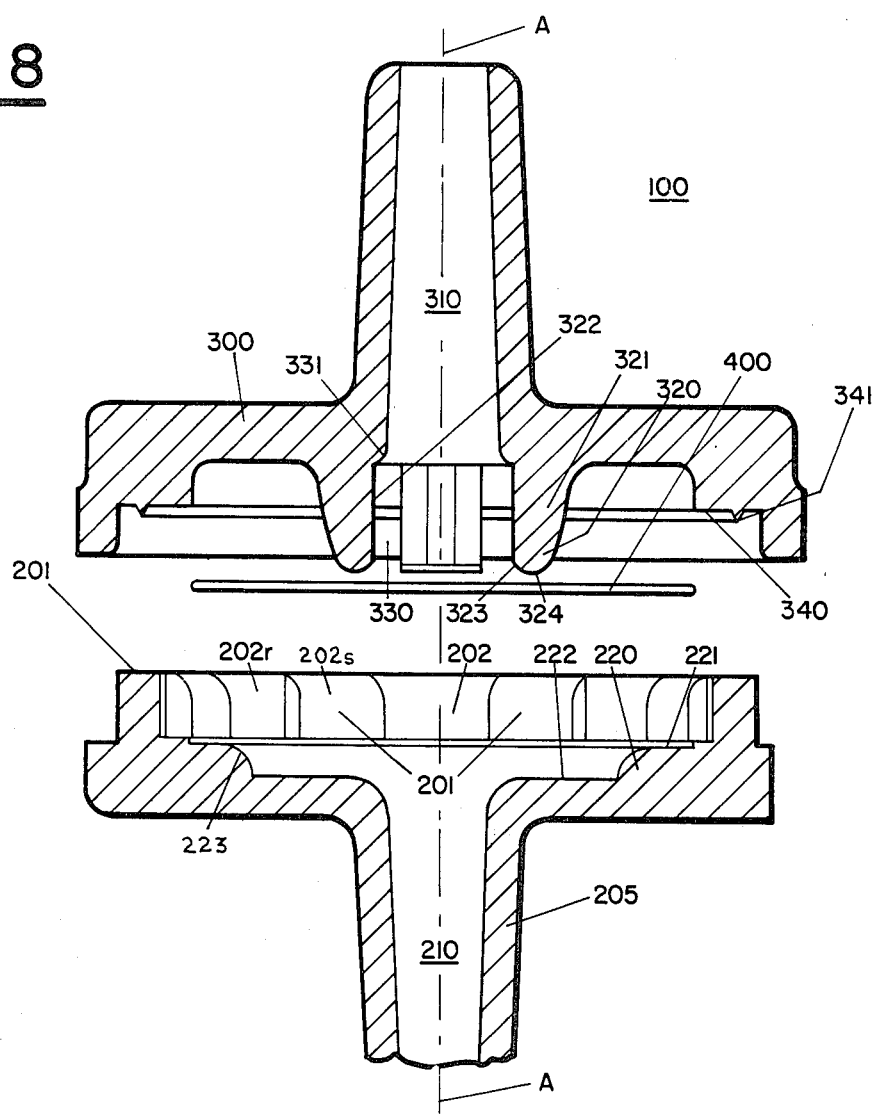
FIG. 8 is a cross-sectional view of the valve of FIG. 7 with the constituent parts of the valve separated to show their inter-relationship with greater clarity.

The control disk 400 is positioned within the control channel 210 of the body member 200. As in the case of the disk 40 of FIG. 2, the disk 400 of FIG. 8 has substantially the same circumferential diameter as the channel 210. In addition the shoulders 201 of the member 200 are provided with a radius in order to prevent the disk 400 from becoming trapped between the parts 200 and 300 during assembly of the valve. It has been discovered that because of the prebiasing of the disk provided by the prongs 320 of the member 300 there is otherwise a tendency for the disk 400 to be shifted out of the channel 210 during the assembly procedure. The radiusing of the shoulders 201 helps to assure that the disk 400 will enter and seat properly in the channel 210. In addition the channel 210 contains a seat 221 of a ring 220 which has substantially the same diameter as the disk 400 in its relaxed, unbiased state. The seat 221 extends slightly below the shoulders 201. Between adjoining ones of the shoulders 201 slots 202 are provided which function in a manner similar to that of the longitudinal channels 26 shown in FIG. 3. However, instead of being semicircular, the slots 202 of FIG. 8 are quadrilateral with side walls 202s that lie along the radius from the central axis A. In addition each slot 202 has a rear wall 202r that is an arc of a cylinder that is concentric with the axis A. This configuration of the slots has been found desirable to facilitate construction of the member 220, as well as promote the operation of the valve. Moreover, it has been found desirable to uniformly distribute the slots along the wall of the valve with the slots 202 having the same arc length as the shoulders 201. In the illustrative embodiment of FIG. 8, eight slots are provided and eight shoulders.

Also indicated in FIG. 8 is the extension of the seat 221 below edges of the slots 202. This disposition of the slots relative to the seat has been found to further promote the operation of the valve. Additionally, the ring 220 has a base 222 which has a diameter that makes the area of the base 222 greater than one-fourth the area of the seat 221. In an illustrative embodiment of the invention the ratio between the diameter of the base 222 and the seat 221 was approximately 3 to 4.

The entry from the base 222 into the channel 210 at the coupling portion 205 of the member 200 includes a rounded edge 223. This limits the tendency for the disk 400 to be sucked into the channel 210 at the coupling 205.

As can be seen for the member 300 of FIG. 8, the biasing prongs 320 are provided with outwardly sloping buttresses 321 in order to give them suitable strength. In an illustrative embodiment of the invention the angle of the buttress with respect to the linear inner wall 322 was approximately 15°. A similar angle of depression was found appropriate for the inwardly tapered surface 323 extending from the tip 324 of each prong 320. A channel 330 is provided between adjoining ones of the wedged-shaped prongs 320. The base of each channel 330 has a rounded edge 331 where the channel 310 meets the prong channel 330. A shelf 340 that engages the upper surfaces of the shoulders 201 when the parts 200 and 300 are assembled includes a ridge 341 of triangular cross-section that is included in order to promote the sealing of the parts 200 and 300 together by sonic bonding.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A flow control device comprising
a housing;
a flow channel in said housing extending to a control channel which is coaxial therewith;
a valve seat in said control channel surrounding a further flow channel extending from said control channel; and
a flexible disc positioned on said valve seat of said control channel,
said control channel having an inside wall surface extending from said valve seat and interrupted by a plurality of peripheral relief channels; and
means for prebiasing said flexible disc comprising a set of prongs for engaging the central portion of said disc within the opening of said valve seat and being separated by passageways which extend to said flow channel;
the diameter of the interrupted inside wall surface being less than the diameter of said disc;
thereby to assure precise positioning of said disc on said valve seat.

2. A control device as defined in claim 1 wherein said relief channels commence at the edge position of said disk when positioned in said housing.

3. A control device as defined in claim 1 wherein said wall surface is terminated at an outer extremity by rounded shoulders.

4. A control device as defined in claim 1 wherein said relief channels have side walls which are in alignment with radii that extend outwardly from the central axis of said device.

5. A control device as defined in claim 1 wherein each relief channel has a rear wall which is coincident with a cylindrical surface that is concentric with the central axis of said device.

6. A control device as defined in claim 1 wherein each prong includes a buttress that slopes away from a peak of the prong towards the base thereof.

7. A control device as defined in claim 6 wherein the buttress has an angle of approximately 15° with respect to the central axis of said device.

8. A control device as defined in claim 1 wherein said prong includes a portion that slopes away from the peak thereof towards said control channel.

9. A control device as defined in claim 1 wherein said housing is in two mating parts, one of which includes a ridge at the mating surfaces of said parts of promote the sealing of said device.

10. A control device as defined in claim 9 wherein said device is sealed by ultrasonic bonding and said ridge has a triangular cross-section.

11. A control device as defined in claim 1 wherein one of the flow channels contains a base that extends to an outlet with a curved shoulder between said outlet and said base to limit the distortion and distension of said disk during the operation of said valve.

12. A control device as defined in claim 1 wherein said prongs are circumferentially disposed about an opening that is coaxial with said flow channel and has a greater diameter than said flow channel.

* * * * *